United States Patent [19]

Marbury

[11] 4,209,283
[45] Jun. 24, 1980

[54] WAVE-TO-HYDRAULIC POWER CONVERTER

[76] Inventor: Fendall Marbury, 9010 Kensington Pkwy., Chevy Chase, Md. 20015

[21] Appl. No.: 942,128

[22] Filed: Sep. 13, 1978

[51] Int. Cl.² ............................................. F04B 17/00
[52] U.S. Cl. ........................................ 417/332; 60/500
[58] Field of Search ............... 417/330, 331, 332, 333, 417/337; 60/500, 501; 92/118

[56] References Cited

U.S. PATENT DOCUMENTS

| | | | |
|---|---|---|---|
| 930,536 | 8/1909 | Daily | 417/333 |
| 1,567,470 | 12/1925 | Settle | 60/500 |
| 2,278,818 | 4/1942 | Zoppa | 417/330 |
| 3,020,870 | 2/1962 | Skovranek | 417/332 X |
| 3,151,564 | 10/1964 | Rosenberg | 417/330 |
| 3,274,941 | 9/1966 | Parr | 417/331 |
| 4,118,932 | 10/1978 | Sivill | 417/332 |

FOREIGN PATENT DOCUMENTS 1448204  9/1976  United Kingdom ...................... 60/500

Primary Examiner—Richard E. Gluck

[57] ABSTRACT

A water wave-to-hydraulic power converter pumps quantities of working liquid which are approximately proportional to the square of wave height. A reciprocating force pump is attached pivotally to a pair of hinged hulls, the cylinder to one hull and the piston rod to the other hull, so that the axis defined by the points of pivotal connection intersects the axis of the interhull hinge when the hulls are at rest, in the absence of waves.

4 Claims, 11 Drawing Figures

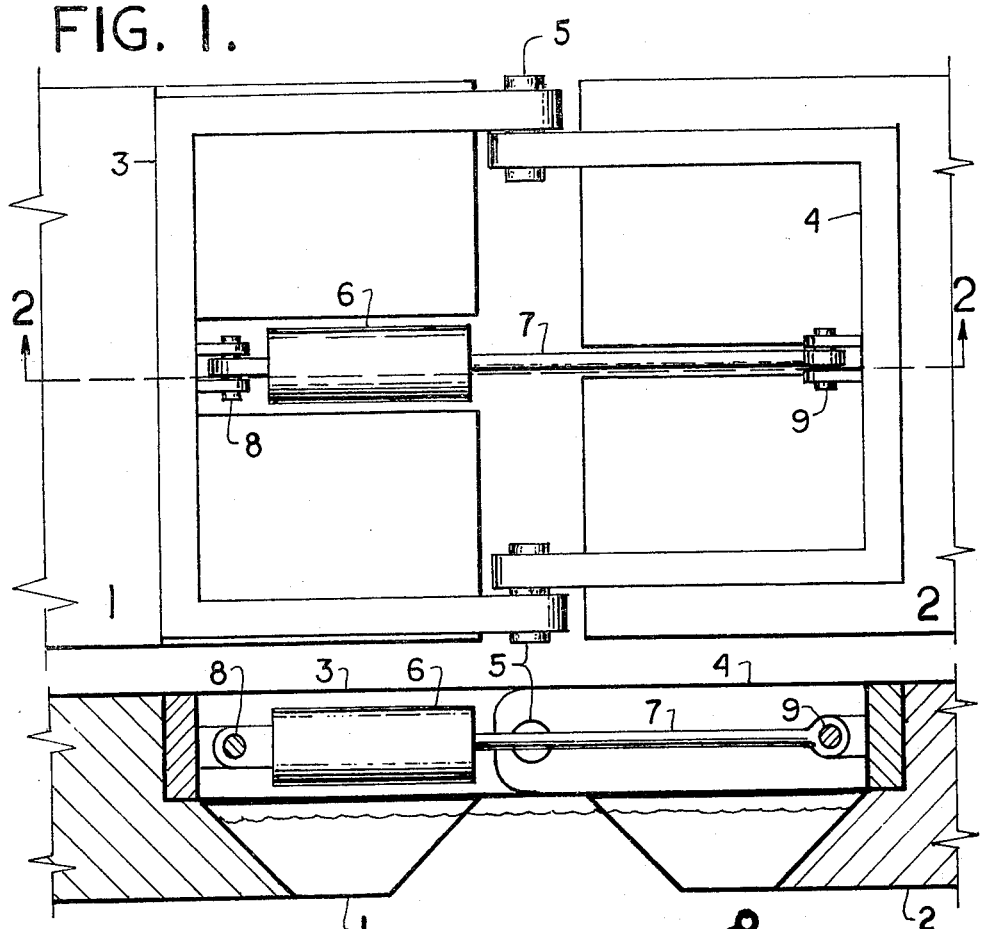
FIG. 1.
FIG. 2.
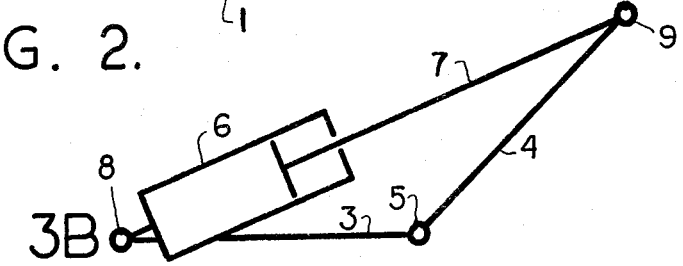
FIG. 3A
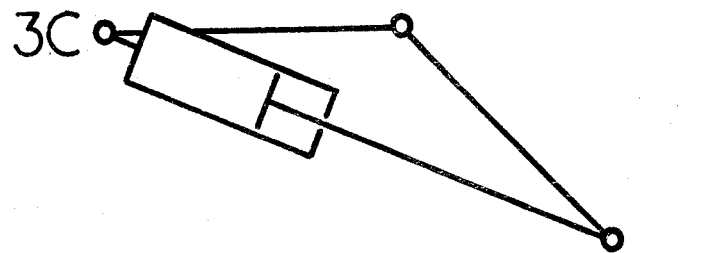

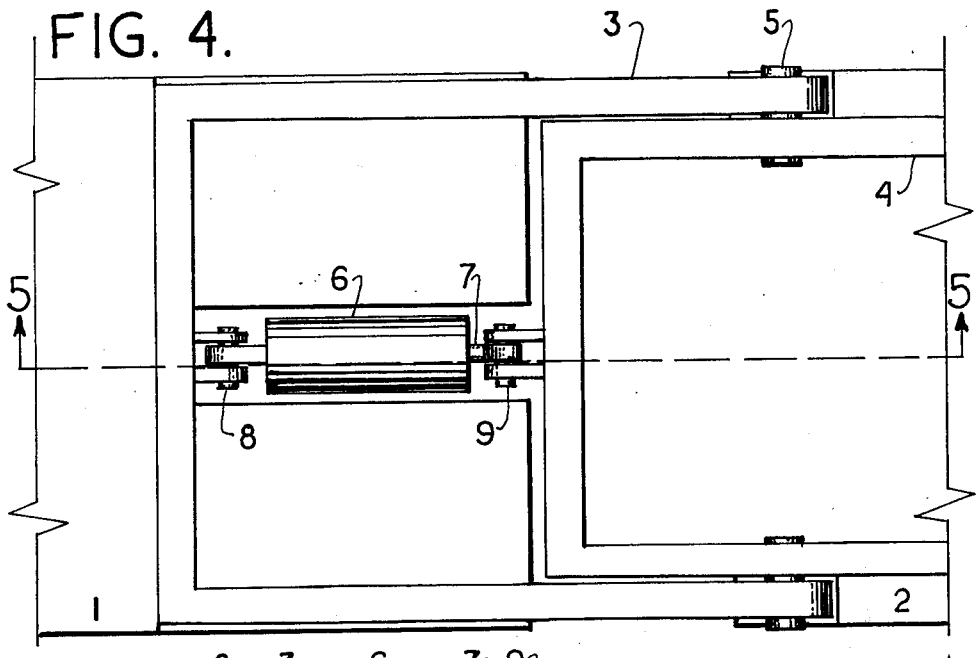
FIG. 4.
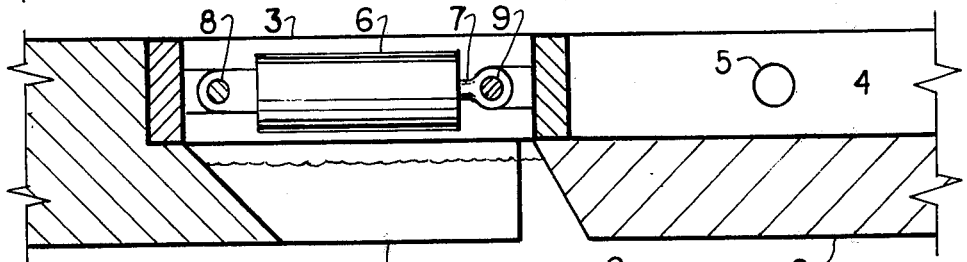
FIG. 5.
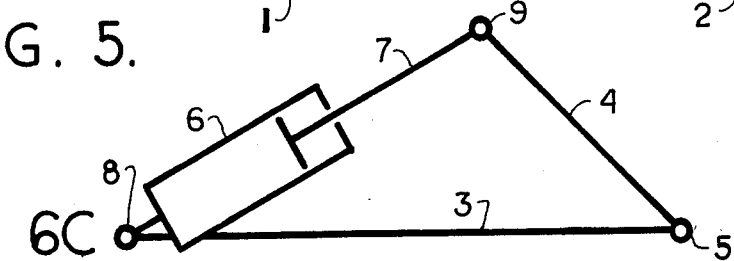
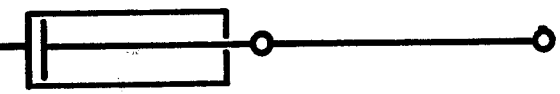
FIG. 6A
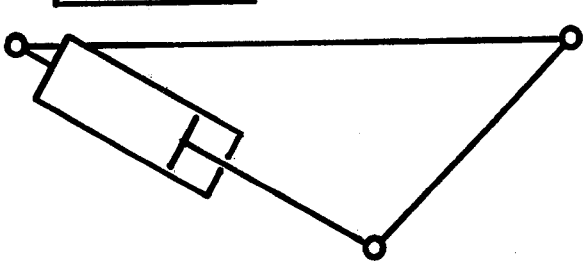

WAVE-TO-HYDRAULIC POWER CONVERTER

TECHNICAL FIELD

The present invention relates to systems for absorbing the power of water waves and converting it into some other form, such as hydraulic, mechanical, or electric power, or to hydraulic, mechanical, and electric power in that sequence. It relates particularly to such systems wherein the wave-engaging elements comprise two or more members connected, each to its neighbor(s), by hinge(s) in such manner that the passage of waves causes oscillatory rotations to occur between adjacent members at their common hinge. The present invention converts such oscillatory rotations at a hinge into hydraulic power.

BACKGROUND ART

In many such prior-art systems, the wave-engaging elements are hulls floating in the water, in which cases the said oscillatory rotations may be called "relative pitch" or "relative roll" between one hull and the next. It is a characteristic of hinged-hull systems, and of some other types as well, that they have a well-defined position of equilibrium in which they rest whenever there are no waves. The said oscillatory rotations occur about this rest position, first in one sense and then in the other. If a pair of hinged hulls be considered straight when at rest, they will become concave downward as the crest of a wave passes, then straight at the wave's quarter-length point, then concave upward as the trough passes, then straight again at the other quarter-length point. Thus each wave flexes a hinge both up and down. The resulting angles of relative pitch vary from wave to have and are not large in most weather, 20 degrees from rest position being greater than average even in the absence of any resistance to the hinging action.

All the said systems provide some means to convert the said variable wave-induced oscillations into mechanical shaft power, thence usually to electric power. The conversion is direct in some systems, while others use an intermediate hydraulic or other type of stage. A wide variety of said means is found in the prior art, said means being a patentable feature of some prior-art inventions.

While the variety of said means is wide in the prior art, there is by contrast much less variety in the manner in which the means is installed. The prior art can in fact be said to have evolved a standard method or arrangement for installing such means, one used in a majority of hinged-hull systems. This method is illustrated by, among others, the following:

Hillson, U.S. Pat. No. 882,883, FIGS. 1 and 2.
Casella, et al, U.S. Pat. No. 917,411, FIGS. 1, 2 and 5.
Tornkvist, U.S. Pat. No. 4,036,563, FIG. 9.
Cockerell, British Pat. No. 1,448,204, the drawing, which, with their respective verbal disclosures, are hereby incorporated by reference into this application.

In these references, each said conversion means includes an element whose two ends are pivotally connected, one end to one and the other end to the other, of a hinge-connected pair of hulls. As the hulls pitch, the distance between the points of connection fluctuates, thus changing the length of said element of said conversion means. Said means resists changes to the length of said element, so that work is done by the hulls on said element. Said means is arranged either to dissipate work done on said element, or to transmit it elsewhere.

Said element thus has a definite line of action, defined by its points of connection to the two hulls. In all the foregoing references, and in others as well, the line of action of said element lies well clear of the axis of the hinge which connects the two hulls. As the references show clearly, this is true when the hulls are at rest, and it remains true when the interhull joint is deflected by waves.

This separation between the line of action of the work-absorbing element and the axis of the interhull hinge is a remarkably stable feature of the prior art. In the four references cited above, this feature appears in association with three different kinds of work-absorbing elements. In Casella, et al, there are at least two such lines of action, both well clear of the hinge axis, one above and the other below. In Tornkvist's FIG. 9, the hinge-connected wave-engaging members are not hulls in the ordinary sense of the word, but the standard arrangement for work-absorbing elements appears nonetheless.

The said standard arrangement of installations of energy-absorbing elements gives the associated systems two characteristics which are noteworthy, because the present invention changes them:

1. As a single wave passes, the energy-absorbing element goes through a single cycle of length change. When said element's line of action is above the hinge axis, for instance, the passage of a wave crest lengthens the element, while the passage of a trough shortens it, both changes being relative to said element's length with the system at rest.
2. The amount of length change by said element is, approximately, directly proportional to the angle of relative pitch between the two hinged hulls. In particular, if said element were a hydraulic cylinder and piston so valved as to function as a double-acting force pump, the arrangement pictured by Cockerell, it would deliver an amount of liquid nearly proportional to the hulls' angle of relative pitch.

It is also worth mentioning that the said standard arrangement lends itself to the use of robust, serviceable, proven hardware. In particular, said arrangement is compatible with use of a hydraulic reciprocating force pump as the work-absorbing means. The loads imposed on the piston and cylinder of such a pump by the said standard arrangement are all axial, thanks to the pivotal end connections. This is desirable, because sidewise loads between piston and cylinder, or between piston rod and seal, promote wear and shorten service life.

A departure from the standard arrangement just described was recently made by Hagen in U.S. Pat. No. 4,077,213, which is hereby incorporated by reference into this application. Hagen's objective is to maximize the efficiency of a system which converts power from water wave to hydraulic to mechanical to electric forms, in that order.

To produce alternating current for general use, it is necessary that the mechanical rotor of its generator be run at constant speed, and such a constant speed is desirable for other types of electric power generation as well. This imposes a constant speed of rotation on the hydraulic-to-mechanical conversion machine. A simple, reliable machine of the latter type is the Pelton wheel, which also is suitable for high pressure drops. The Pelton wheel is highly efficient as long as its speed and inlet pressure are compatible. With the speed restricted to being substantially constant, it becomes desirable to hold the inlet pressure constant also.

This means that the wave-to-hydraulic power converter should deliver substantially constant pressure. Where said converter is a hinged-hull system using the standard prior-art arrangement of its energy-extraction element, and where the system is so regulated that said converter delivers substantially constant pressure, then the energy obtained from a wave will be directly proportional, other things equal, to the wave's height. This is because the motions of the hulls, and of most other types of wave-engaging member, are almost directly proportional, other things equal, to wave height. Said obtained energy is equal to the force on the piston of the conveeter, which is substantially constant, times the piston's stroke, which is substantially directly proportional to wave height.

This is not in general the best amount of energy to obtain from a wave. The amount of power being delivered by a succession of waves, which one would like to obtain, is proportional, other things equal, to the square of wave height. Hagen points this out and prescribes that his wave-to-hydraulic unit deliver an amount of liquid which is more than directly proportional to the relative pitch between adjacent hulls, thus more than directly proportional, other things equal, to wave height. Hagen also discloses and claims two different means for converting relative pitching of hinged hulls into hydraulic power which work as prescribed.

Thus Hagen succeeded in prescribing characteristics for a wave-to-hydraulic power conversion means which can not only be efficient itself, but also facilitates maintenance of peak efficiency throughout the several other, serial stages of power conversion performed by the system of which it is a part. This is an important step towards the practical production of power from waves.

It detracts little from this achievment to point out that the two particular means disclosed by Hagen appear to be less serviceable than the best prior art. The one shown in FIGS. 3–6, inclusive, uses large areas of flexible material in a flexing mode, while the other, FIGS. 7 and 8, puts heavy lateral loads on a hydraulic cylinder and piston.

BRIEF SUMMARY OF THE INVENTION

The object of the present invention is to combine, in a wave-to-hydraulic power converter for use in association with a pair of hinged hulls or the like, the simple ruggedness of the most serviceable prior art with the characteristic of pumping amounts of liquid proportional, approximately, to the squares of the relative pitch angles between hulls. The present invention achieves this object by departing from the standard arrangement for such converters evolved by the prior art.

To practice the present invention, a hydraulic cylinder with piston may be used, with the cylinder pivotally connected to one of a pair of hinged hulls and the outer end of the piston rod connected pivotally to the other said hull, as in the prior art. At variance with the prior art, the axis defined by the two points of pivotal connection, which preferably is also the axis of the cylinder and piston rod, intersects substantially at right angles the axis of the hinges which connect the two hulls when the hulls are floating at rest, in the absence of waves.

BRIEF DESCRIPTION OF THE DRAWINGS

FIG. 1 is a plan view of a preferred embodiment of the invention installed on and connecting together two hulls, the ends of which only are shown.

FIG. 2 is a section taken near the vertical centerplane of FIG. 1, showing the assemblage in elevation with the hulls at rest on calm water.

FIG. 3 is a diagrammatic representation of the invention in action, showing the relative positions assumed by its principal parts as a wave passes.

FIG. 3A shows the invention when at rest in smooth water, which position it also passes through twice each wave cycle when the interhull hinge is about midway between crest and trough.

FIG. 3B shows the invention with hulls concave upward, hinge near a wave trough.

FIG. 3C shows the invention with hulls concave downward, hinge near a wave crest.

FIGS. 4, 5, and 6 illustrate an alternate embodiment of the invention in the same ways as FIGS. 1, 2, and 3, respectively.

FIG. 7A shows the converter undeflected, while FIGS. 7B and 7C show the hulls concave upward with relative pitch angles of 30° and 60°, respectively. For ease of comprehension, pitch angles are greater than normal in all the figures that show them.

DETAILED DESCRIPTION

Figure 7:
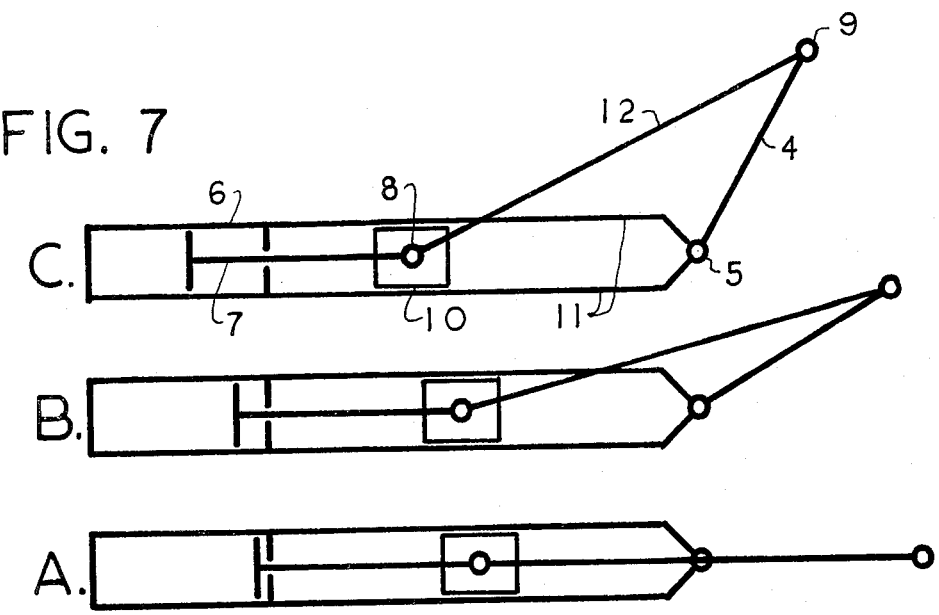
FIG. 7 shows diagrammatic longitudinal sections through a modified version of the FIG. 1 embodiment which replaces the oscillating cylinder with a cylinder fixed to one hull and crosshead with guides likewise fixed to the same hull.

FIGS. 1 and 2 show the presently preferred embodiment of the invention. Hulls 1 and 2, of which only the right and left ends, respectively, are shown, have U-shaped members 3 and 4 fastened flush with their respective decks. The projecting ends of 3 and 4 are connected pivotally by transverse pins 5—5, the whole assemblage forming a hinge which joins hulls 1 and 2 so as to leave a single degree of free motion, namely a rotation about the axis defined by pins 5—5, of one hull relative to the other, called in this case "relative pitch".

The work-absorbing unit in this embodiment is hydraulic cylinder 6 in cooperation with piston and rod assembly 7. Cylinder 6 is fitted to act as a force pump when piston rod 7 is moved, being equipped with inlet and outlet check valves at each end. The valves are not shown, being standard items. Likewise not shown, for the same reason, are hose and piping conducting high-pressure working liquid from the outlet of cylinder 6 to the next stage of power conversion, the rest of the power-conversion system, and other hose and piping bringing low-pressure working liquid back to cylinder 6's inlet.

Cylinder 6 is pivotally connected to member 3 by pin 8, whose centerline preferably intersects the axis of cylinder 6. Piston rod 7 is pivotally connected to member 4 by pin 9, whose centerline likewise preferably intersects the extended axis of cylinder 6.

FIG. 2, a sectional elevation taken near the centerplane of the hulls, shows said hulls in the rest position. The water, whose surface is visible below the main hinge 5 and in the centerline slots in the ends of hulls 1 and 2, is substantially calm. In this position, the axis defined by the centers of pins 8 and 9, which preferably is also the axis of cylinder 6 and piston rod 7, intersects the main hinge axis 5—5 at right angles.

The converter will still function well if axes 5—5 and 8-9 miss each other by a small distance with the hulls at rest. For good results, however, said miss distance should be kept small compared to the distance from pin 8 or pin 9 to axis 5—5.

The plane defined at rest position by axis 5—5 and the centerlines of pins 8 and 9 is shown horizontal, and approximately horizontal will often be a convenient and economical orientation for it. The converter will, however, function properly with this plane at any orientation.

The distance from pin 8 to axis 5—5 is shown equal to the distance from pin 9 to axis 5—5. This appears to be the best proportion, but there is little penalty for moderate departures from it. If either of said pins coincides with axis 5—5, the converter becomes inoperative, and it becomes progressively less operative as either said pin nears axis 5—5. As will be shown below, the piston stroke is directly proportional, other things equal, to the distance from 8 and 9 to axis 5—5.

U-shaped members 3 and 4 could very well be built into their respective hulls so as not to be clearly visible. They are shown prominently here in order to clarify the presentation by providing a direct basis for parts of the diagrammatic FIGS. 3.

FIGS. 3A, 3B, and 3C are views similar to FIG. 2, but with piston positions shown and details suppressed. The embodiment is shown undeflected in 3A, with hulls concave upward in 3B, and with hulls concave downward in 3C. Member 3 (and hull 1) is shown horizontal in all three figures, while member 4 (and hull 2) is horizontal in 3A, 30° up in 3B, and 30° down in 3C.

FIG. 3A shows that, when the converter is in its rest position, piston rod 7 is at one end of its stroke. Specifically, rod 7 is drawn as far out of cylinder 6 as it can come. Relative pitch in either sense will push rod 7 into cylinder 6, as shown by FIGS. 3B and 3C. Relative pitch is alternately up and down in waves; so the passage of a single wave will put the invention through a series of relative positions such as A,B,A,C,A.

Thus a single wave puts the piston of the present invention through two complete back-and-forth stroke cycles. This is in contrast to a similar cylinder and piston installed according to the standard prior art arrangement, which would take only a single back-and-forth stroke per wave.

It will now be shown that the piston stroke of the present invention is proportional, approximately, to the square of the relative pitch angle between hulls, measured by counting the rest position as zero relative pitch. Letting R equal the common distance from pins 8 and 9 to axis 5—5, it can be seen that in FIG. 3A the distance from pin 8 to pin 9 is 2R. In FIGS. 3B and 3C, this distance becomes 2R cos (A/2), where A is the angle of relative pitch. The stroke is the difference between these two distances:

$$S = 2R(1 - \cos(A/2))$$

From handbooks of mathematics, $\cos x = 1 - x^2/2! + x^4/4! - x^6/6! + \ldots$

Substituting the infinite series for the cosine into the expression for S and simplifying, $$S = (r/4)(A^2 - A^4/2 \times 4! + A^6/8 \times 6! - \ldots)$$

At the very large relative pitch angle of A=0.5 radian (28.6°), the second term of the expression for S is equal to about one-half percent of the first, the $A^2$ term, and succeeding terms become rapidly smaller yet. At smaller angles, the $A^4$ and succeeding terms become smaller relative to the $A^2$ term. Over the range of pitch angles at which the subject invention will work, it is thus an accurate approximation to say that stroke is proportional to the square of relative pitch angle. Stroke is also seen to be directly proportional to the pin-to-hinge-axis distance R.

FIGS. 4, 5, and 6 illustrate an alternate embodiment of the present invention in views similar to FIGS. 1, 2, and 3, respectively. The similarity of the two embodiments is such that each piece in FIGS. 1, 2, and 3 has a counterpart in FIGS. 4, 5, and 6 which has the same function and in most cases the same appearance as well. These counterparts have for convenience been given the same numbers in both sets of figures. The differences in operation of the two embodiments will now be discussed.

The most obvious difference is in the position of the piston at zero relative pitch, as with hulls at rest. In this position, piston assembly 7 of the alternate embodiment is as far as it will go into cylinder 6, while in the preferred embodiment it is as far as possible out. As FIGS. 6 show, relative pitch in either sense draws piston rod 7 out of cylinder 6, instead of pushing it in.

To make the alternate arrangement possible, U-shaped members 3 and 4 were changed. Where before they were of equal depth and arranged symmetrically about axis 5—5, in the alternative they are of unequal depth and nested, 4 within 3, depth being measured from axis 5—5 to the centerline of pin 8 or 9. The left end of hull 2 no longer needs a slot to accommodate piston rod 7 during pitching, but it must be narrowed to fit between the greatly lengthened projections of U-shaped member 3.

As the following discussion of pros and cons will suggest, the appellations "preferred" and "alternative" must be considered tentative. The main basis for these names is that the preferred embodiment, when about the same overall size as the alternative, has a stroke which is a closer approximation to the desired square-of-pitch behavior. Both are satisfactory at small pitch angles, but, as a comparison of FIGS. 6 to FIGS. 3 will show, they differ appreciably at large angles. The effects of this difference on performance have not yet been measured. The difference can be reduced by lengthening the distance between pins 8 and 9 in the alternate embodiment, measured with hulls at rest.

This would tend to take away one of the alternative embodiment's advantages, its shorter piston rod. The alternate would still enjoy a wide average spacing between piston and piston rod seal, which tends to hold down wear. The alternate's advantages relative to piston rod and cylinder are purchased at the cost of extending the legs of U-shaped member 3 so as to overhang hull 1, or of equivalent added hull structure.

At this writing, none of the differences between embodiments looks crucial, and both embodiments appear satisfactory.

FIGS. 7 show, in diagrammatic form, a third form of the invention, a modification of the preferred embodiment which incorporates a crosshead. Cylinder 6 no longer oscillates between pins 8 and 9. Instead, it is fixed to hull 1. The outer end of piston rod 7 is connected to crosshead 10. Crosshead guides 11 keep crosshead 10 and piston rod 7 sliding axially into and out of cylinder 6. Pin 8 becomes the wrist pin of crosshead 10, and connecting rod 12 transmits the pitching motions of hull 2 relative to hull 1 via U-shaped member 4 and pin 9.

The modified linkage is similar to the original in proportions, but here the distance from pin 8 to pin 9 is fixed, while the distance from pin 8 to axis 5—5 is what varies as the hulls pitch. FIG. 7A shows the zero-pitch position. As before in this position, all the principal parts have their axes in the same plane; cylinder 6, piston rod 7, wrist pin 8, pin 9, member 4, and main hinge axis 5—5.

Also as before, piston 7 makes a stroke when relative pitch occurs in either sense. Only one sense is shown, however. FIG. 7B shows the modified invention with hulls 30° concave up, and FIG. 7C shows it with hulls 60° concave up. At 90° relative pitch, the piston, as drawn, would hit the end of cylinder 6. Taking advantage of the uniform pitch increment, the nonlinear piston motion can be observed by looking at the figures in A,B,C sequence and at the left end of cylinder 6.

I claim:

1. A wave-to-hydraulic power converter, comprising:

two wave-engaging members connected by a hinge which leaves said members free to oscillate relative to each other about the axis of said hinge, wherein said members assume always the same relative position while at rest in the absence of waves, a unit which by resisting changes to its length absorbs energy, with one end of said unit rigidly fixed to a first said wave-engaging member and the other end of said unit fixed to a crosshead slidably mounted in guides which are rigidly fixed to said first member, a connecting rod with one end pivotally connected to said crosshead by a wrist pin and the other end pivotally connected to the second said wave-engaging member, wherein the line of motion of said wrist pin, produced beyond the limits of said wrist pin's motion, substantially intersects said hinge axis, and wherein the axis of said connecting rod, defined by the centers of said wrist pin and of said pivotal connection to said second wave-engaging member, lies substantially in the same plane with said line of motion of said wrist pin and with said hinge axis when said wave-engaging members are in said relative position which they assume when at rest in the absence of waves.

2. The power converter recited in claim 1, wherein said wave-engaging members include a buoyant hull.

3. The power converter recited in claim 1, wherein said energy-absorbing unit is a reciprocating force pump having a cylinder and piston rod; the cylinder of said force pump is connected rigidly to a first said wave-engaging member, and the piston rod of said force pump is connected rigidly to said crosshead.

4. The power converter recited in claim 3, wherein said wave-engaging members include a buoyant hull.

* * * * *